United States Patent
Hishida et al.

(10) Patent No.: US 10,965,198 B2
(45) Date of Patent: Mar. 30, 2021

(54) COIL AND MOTOR USING SAME

(71) Applicant: Panasonic Intellectual Property Management Co., Ltd., Osaka (JP)

(72) Inventors: Mitsuoki Hishida, Osaka (JP); Yuichi Yoshikawa, Osaka (JP); Hirokazu Yamauchi, Osaka (JP); Keiichiro Nukada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/603,317

(22) PCT Filed: Jan. 29, 2018

(86) PCT No.: PCT/JP2018/002745
§ 371 (c)(1),
(2) Date: Oct. 7, 2019

(87) PCT Pub. No.: WO2018/189979
PCT Pub. Date: Oct. 18, 2018

(65) Prior Publication Data
US 2020/0036270 A1 Jan. 30, 2020

(30) Foreign Application Priority Data
Apr. 13, 2017 (JP) .............................. JP2017-079699

(51) Int. Cl.
*H02K 3/12* (2006.01)
*H02K 15/04* (2006.01)
(Continued)

(52) U.S. Cl.
CPC ............. *H02K 15/045* (2013.01); *H01F 5/04* (2013.01); *H02K 3/12* (2013.01); *H02K 3/28* (2013.01)

(58) Field of Classification Search
CPC .. H02K 3/00; H02K 3/12; H02K 3/18; H02K 3/24; H02K 3/30; H02K 3/32; H02K 3/325; H02K 3/52; H02K 3/522
See application file for complete search history.

(56) References Cited

U.S. PATENT DOCUMENTS

| 2,913,606 A | 11/1959 | Nicolas | |
|---|---|---|---|
| 2003/0127933 A1* | 7/2003 | Enomoto | H02K 15/022 310/194 |

(Continued)

FOREIGN PATENT DOCUMENTS

| DE | 102012212637 | 1/2014 |
|---|---|---|
| DE | 102013000899 A1 | 8/2014 |

(Continued)

OTHER PUBLICATIONS

International Search Report of PCT application No. PCT/JP2018/002745 dated Apr. 17, 2018.

(Continued)

*Primary Examiner* — Tran N Nguyen
(74) *Attorney, Agent, or Firm* — McDermott Will & Emery LLP

(57) ABSTRACT

A coil includes a series of turns constituted by a first turn to an n-th turn of a conductive wire having a quadrangular cross-section, where the conductive wire is wound in a spiral shape and is stacked in a vertical direction, and n is an integer equal to or greater than 3. In addition, at least a part of the conductive wire of the first turn to the n-th turn is provided with a deformed part whose shape is different from shapes of the other parts. Further, the first turn and the n-th turn are on the both end parts of the series of turns. In addition, at each of the first turn and the n-th turn, the deformed part makes an outer surface positioned on an opposite side with respect to a center of the series of turns (Continued)

extend in a flush manner along a plane intersecting the series of turns.

2 Claims, 9 Drawing Sheets

(51) Int. Cl.
  *H01F 5/04* (2006.01)
  *H02K 3/28* (2006.01)

(56) References Cited

U.S. PATENT DOCUMENTS

| | | |
|---|---|---|
| 2008/0179983 A1 | 7/2008 | Hasegawa et al. |
| 2010/0066198 A1* | 3/2010 | Fubuki ................ H02K 15/066 310/208 |
| 2011/0127872 A1* | 6/2011 | Podack ............. H02K 15/0421 310/180 |
| 2017/0117767 A1 | 4/2017 | Ishigami et al. |

FOREIGN PATENT DOCUMENTS

| | | |
|---|---|---|
| JP | 2006-157989 A | 6/2006 |
| JP | 2014-036478 | 2/2014 |
| WO | 2016/006310 A1 | 1/2016 |

OTHER PUBLICATIONS

Extended European Search Report dated Mar. 24, 2020 for the related European Patent Application No. 18783820.6.
English Translation of Chinese Search Report dated Oct. 9, 2020 for the related Chinese Patent Application No. 201880023375.6.

* cited by examiner

COIL AND MOTOR USING SAME

TECHNICAL FIELD

The present disclosure relates to a coil in which a conductive wire having a quadrangular cross-section is wound, and relates to a motor using the coil.

BACKGROUND ART

In recent years, there has been an increasing demand for motors for industry use and in-vehicle use. In this situation, improvement of efficiency of motors and reduction in cost are required.

As a method for improving efficiency of a motor, it is known that a space factor of coils disposed in slots of a stator is improved. By improving the space factor of the coils, it is possible to reduce a loss caused by a current flowing through the coils during driving of the motor.

As a method for improving the space factor of coils, there is proposed a configuration in which cast coils having a rectangular cross-section made of a copper material are disposed in slots (for example, see PTL 1).

When a coil is disposed in a slot, a coil is wound in a spiral shape on a tooth provided on a stator. However, to receive supply of current from outside and to supply current to outside, both end parts of the coil generally constitute current lead-out parts extending on an outer peripheral side of the coil. These lead-out parts create, between the tooth and the coil, regions that are so-called dead spaces and in which no coil is wound. On the other hand, heat is one of the causes of decrease in motor efficiency, and the coil easily accumulates heat due to generation of Joule heat. To address this issue, it is necessary to increase a surface area of the coil in the slot so that heat dissipation from the coil can be promoted. However, as described above, there are regions where no coil is wound, and the regions impede improvement of a heat dissipation efficiency of the coil.

CITATION LIST

Patent Literature

PTL 1: German Patent Application Publication No. DE102012212637

SUMMARY OF THE INVENTION

The present disclosure has been made in view of the above points, and an object of the present disclosure is to achieve a coil whose heat dissipation efficiency is more improved and to achieve a motor using the coil.

A coil of the present disclosure is for achieving the above object and includes: a series of turns constituted by a first turn to an n-th turn of a conductive wire having a quadrangular cross-section, where n is an integer equal to or greater than 3, and the conductive wire is wound in a spiral shape and is stacked in a vertical direction; and a deformed part provided on at least a part of the conductive wire of the first turn to the n-th turn, where the deformed part has a shape different from shapes of the other parts. Further, the first turn and the n-th turn are on the both end parts of the series of turns. In addition, at each of the first turn and the n-th turn, the deformed part makes an outer surface positioned on an opposite side with respect to a center of the series of turns extend in a flush manner along a plane intersecting the series of turns.

In accordance with this configuration, at least the part of the conductive wire of the first turn to the n-th turn is provided with the deformed part whose shape is different from the shapes of the other parts, and the outer surface positioned on the opposite side with respect to the center of the series of turns extends in a flush manner along the plane intersecting the series of turns at each of the first turn and the n-th turn, which are positioned on the both end parts of the series of turns. This configuration can reduce dead spaces that are created when the coil is wound in a spiral shape and in which no conductive wire is wound. Therefore, the heat dissipation efficiency of the coil can be increased.

The present disclosure can further increase the heat dissipation efficiency of a coil. Therefore, a highly efficient motor can be achieved.

DESCRIPTION OF EMBODIMENT

Hereinafter, an exemplary embodiment of the present disclosure will be described in detail with reference to the drawings. The following description of a preferred exemplary embodiment is inherently only an example and is not intended at all to limit the present disclosure, applications of the present disclosure, or use of the present disclosure.

Exemplary Embodiment

[Structure of Motor]

Figure 1A:
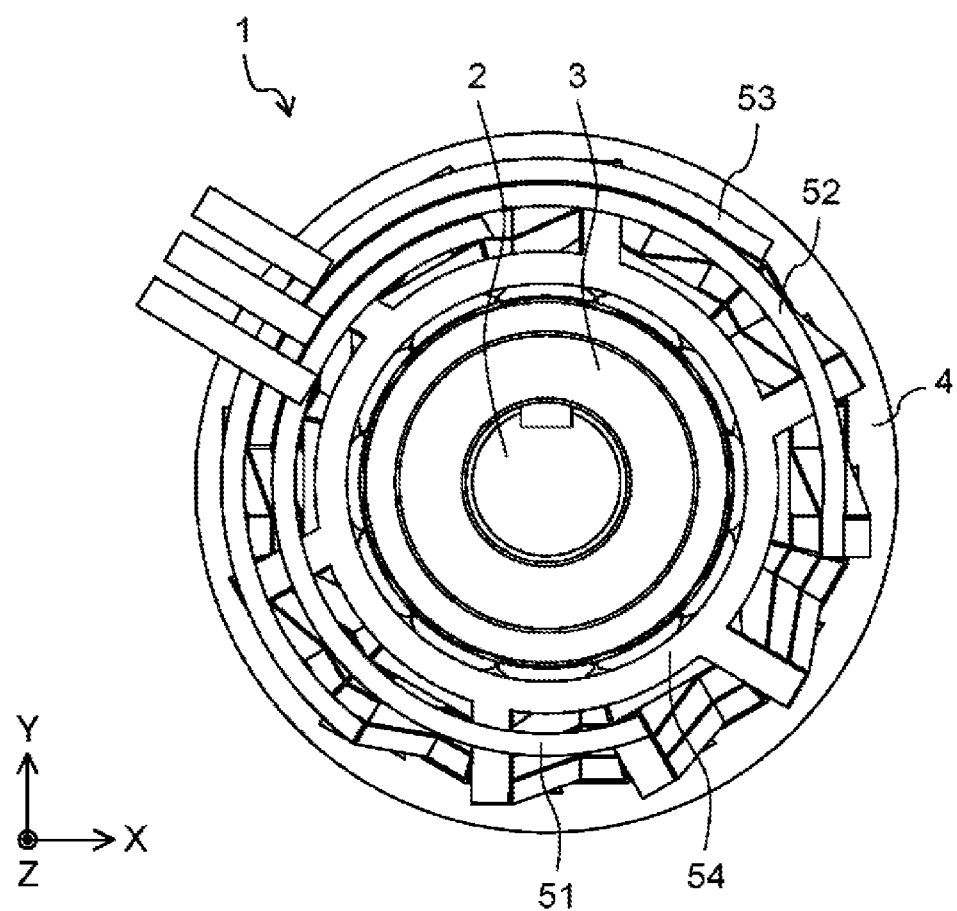
FIG. 1A is an upper surface view showing a motor according to an exemplary embodiment.
Figure 1B:
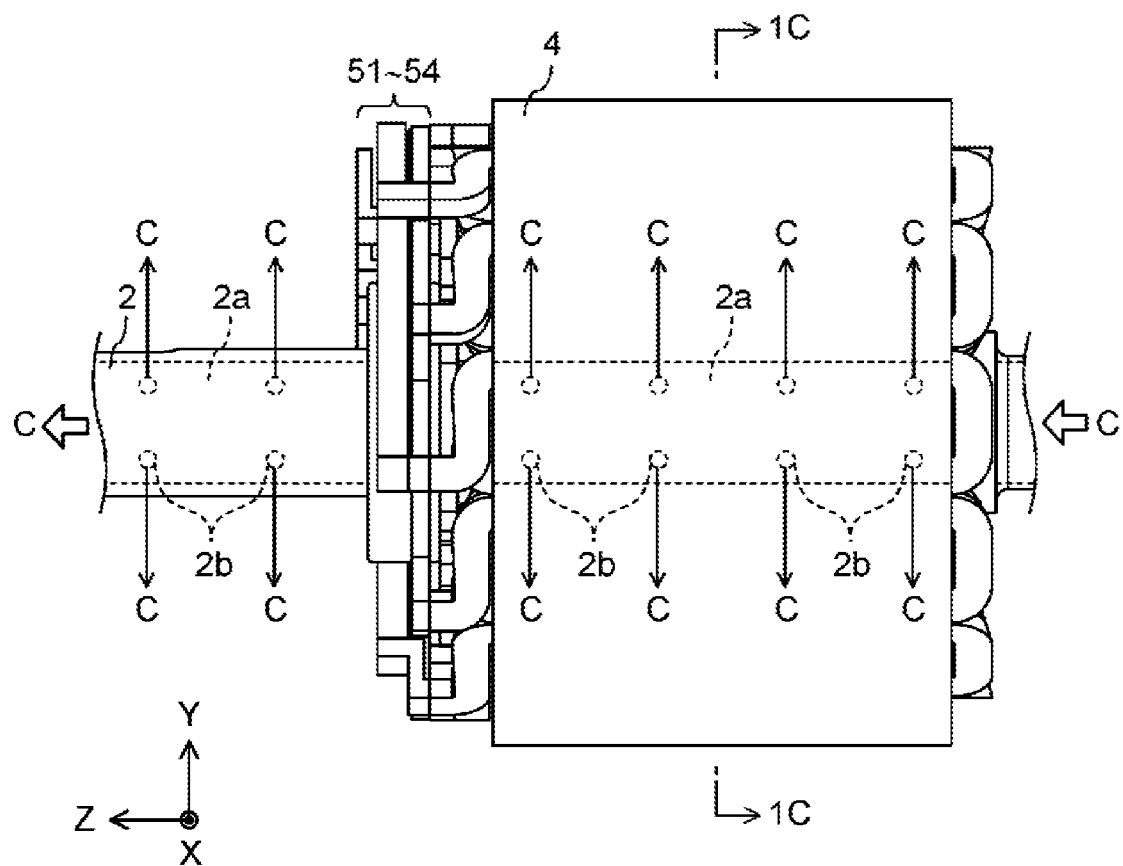
FIG. 1B is a side view showing the motor according to the exemplary embodiment.
Figure 1C:
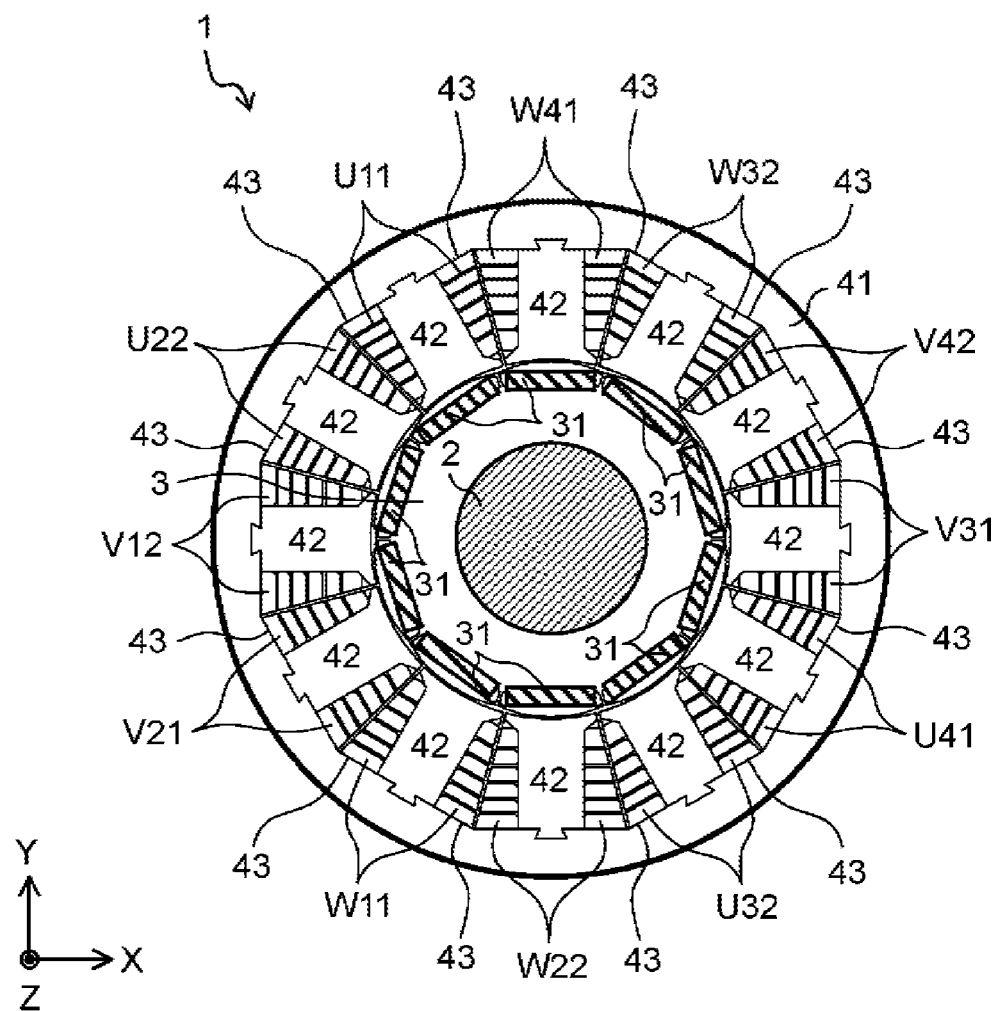
FIG. 1C is a sectional view taken along line 1C-1C in FIG. 1B.

FIG. 1A is an upper surface view showing motor 1 according to an exemplary embodiment. FIG. 1B is a side view showing motor 1 according to the exemplary embodiment. FIG. 1C is a sectional view taken along line 1C-1C in FIG. 1B. However, any of the drawings does not show a cover case and the like. Motor 1 includes, inside a cover case (not shown), shaft 2, rotor 3, stator 4, coils U11 to U41, V12 to V42, and W11 to W41, and bus bars 51 to 54.

Here, a longitudinal direction of shaft 2 (direction perpendicular to a paper surface of FIG. 1A) is referred to a Z-axis direction, and directions perpendicular to the Z-axis direction (direction parallel to the paper surface of FIG. 1A) are referred to as an X-axis direction, and a Y-axis direction. The X-axis direction and the Y-axis direction intersect perpendicular to each other.

The word "integrally" means not only a state where a plurality of components are connected mechanically, for example, by bolting, swaging, or the like but also a state where the components are electrically connected into one object by material boding such as covalent bonding, ionic bonding, or metallic bonding or a state where whole the components are electrically connected into one object by material boding such as fusion.

Shaft 2 has, inside shaft 2, hollow part 2a extending in the Z-axis direction. In a side surface of shaft 2, there are provided a plurality of through holes 2b. Hollow part 2a is a passage through which cooling medium C flows to cool an inside of motor 1. Cooling medium C flows inside hollow part 2a along the Z-axis direction and circulates inside motor 1. Further, part of cooling medium C flowing inside hollow part 2a flows out through a plurality of through holes 2b and flows also from a central side of motor 1 to an outer side, in other words, flows, from rotor 3, in a direction toward a place where stator 4 is positioned, thereby cooling rotor 3 and stator 4.

Rotor 3 is provided in contact with an outer periphery of shaft 2. Rotor 3 includes magnets 31 constituted by N-poles and S-poles alternately arranged, along an outer peripheral direction of shaft 2, to face stator 4. In the present exemplary embodiment, neodymium magnets are used as magnets 31 used for rotor 3; however, a material, a shape, and a material type of magnets 31 can be appropriately changed depending on an output of the motor and the like.

Stator 4 has: stator core 41 having a substantially circular ring shape; a plurality of teeth 42 equidistantly provided along an inner periphery of stator core 41; and slots 43 each provided between teeth 42. Stator 4 is disposed on an outer side of rotor 3 with a certain distance apart from rotor 3 when viewed from the Z-axis direction.

Stator core 41 is formed, for example, by stacking electromagnetic steel sheets containing silicon and the like and then by die-cutting the stacked electromagnetic steel sheets.

In the present exemplary embodiment, the number of poles of rotor 3 is totally 10 including 5 N-poles and 5 S-poles opposed to stator 4. The number of slots 43 is 12. However, the number of poles and the number of slots 43 of rotor 3 are not particularly limited to the above figures, and the present disclosure can apply to a combination of other number of poles and number of slots.

Stator 4 has 12 coils U11 to U41, V12 to V42, and W11 to W41. Each of coils U11 to U41, V12 to V42, and W11 to W41 is attached to the corresponding tooth 42 and is disposed in the corresponding slots 43 when viewed from the Z-axis direction. That is, each of coils U11 to U41, V12 to V42, and W11 to W41 is concentratedly wound on each tooth 42. Further, coils U11 to U41, coils V12 to V42, and coils W11 to W41 are disposed being respectively integrated with bus bar 51, bus bar 52, and bus bar 53.

Here, regarding reference marks UPQ, VPQ, and WPQ representing the coils, the first characters each represent each phase of motor 1 (U-phase, V-phase, and W-phase in the case of the present exemplary embodiment). The second characters each represent an order of coil arrangement in the same phase. The third characters each represent a winding direction of each coil, and 1 and 2 respectively represent the clockwise direction and the anticlockwise direction in the present exemplary embodiment. Therefore, coil U11 indicates that the coil is at the first arrangement order for U-phase and is wound in the clockwise direction. Coil V42 indicates that the coil is at the fourth arrangement order for V-phase and is wound in the anticlockwise direction. Note that the "clockwise" is a right turn when viewed from a center of motor 1, and the "anticlockwise" is a left turn when viewed from the center of motor 1.

Strictly speaking, coils U11 and U41 are U-phase coils, and coils U22 and U32 are U-bar phase coils (which generate a magnetic field in the opposite direction of the magnetic field generated by U-phase coils). However, in the following description, both are collectively referred to as U-phase coils, unless particularly mentioned. Similarly, coils V12 to V42 and coils W11 to W41 are collectively referred to as V-phase coils and W-phase coils, respectively.

[Structure of Coil]

Figure 2:
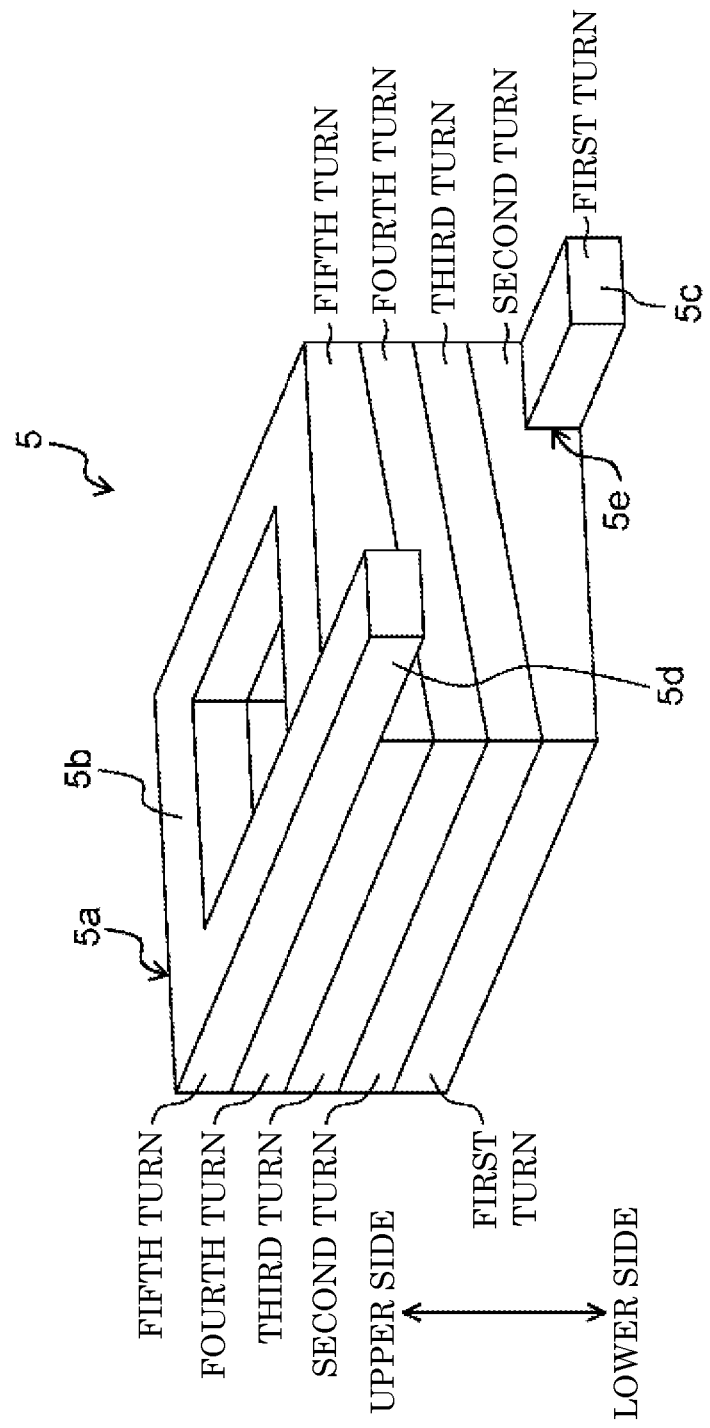
FIG. 2 is a perspective view showing a coil according to the exemplary embodiment.
Figure 3:
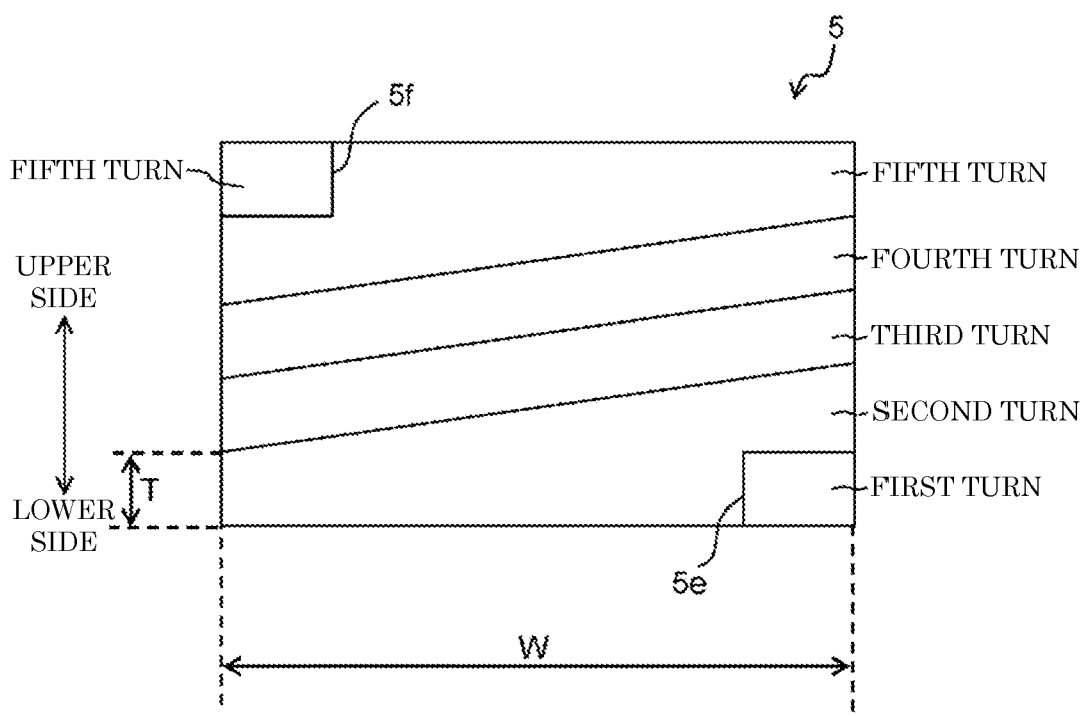
FIG. 3 is a side view showing the coil according to the exemplary embodiment.
Figure 4:
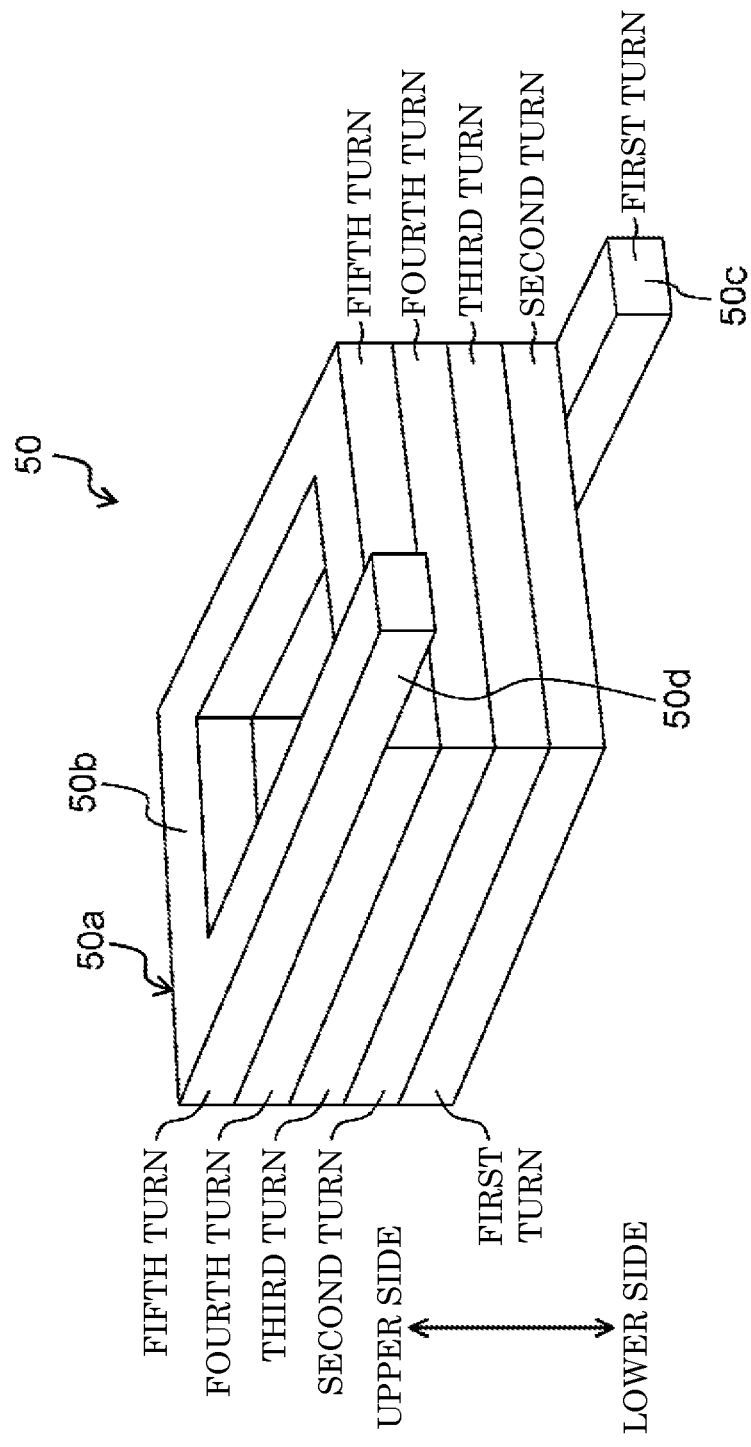
FIG. 4 is a perspective view showing a coil for comparison.
Figure 5:
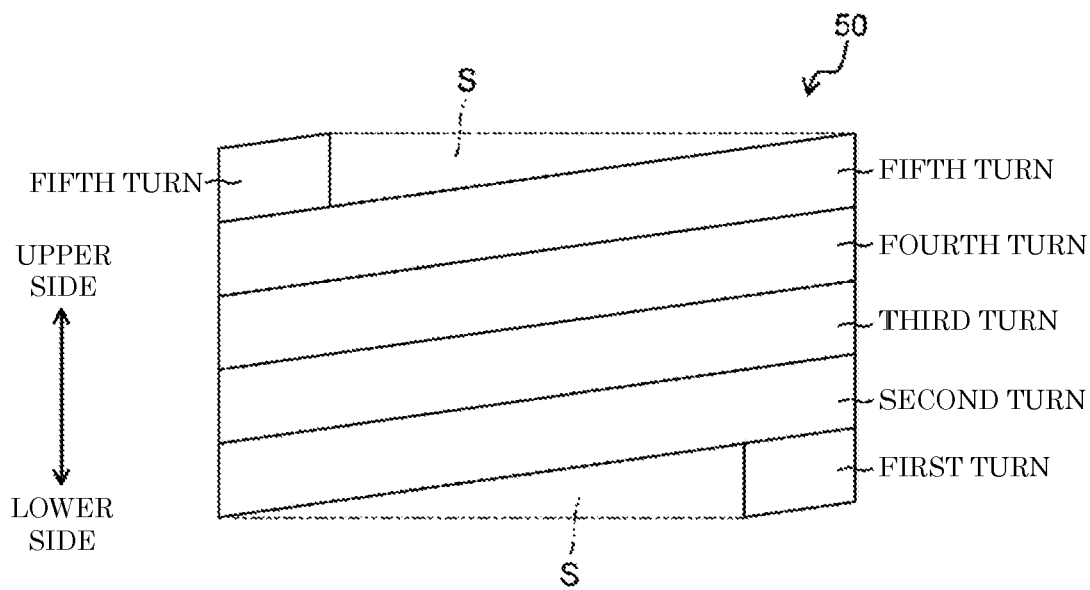
FIG. 5 is a side view of the coil for comparison.

FIG. 2 is a perspective view showing coil 5 according to the exemplary embodiment. FIG. 3 is a side view showing coil 5 according to the exemplary embodiment. FIG. 4 is a perspective view showing coil 50 for comparison. FIG. 5 is a side view of coil 50 for comparison. Note that FIG. 3 and FIG. 5 show side surfaces of coil 5 and coil 50 when viewed from a direction of tip ends of lead-out parts 5c, 5d and from a direction of tip ends of lead-out parts 50c, 50d, where lead-out parts 5c, 5d are respectively provided on the first turn and the fifth turn of coil 5, and lead-out parts 50c, 50d are respectively provided on the first turn and the fifth turn of coil 50. Further, coil 5 shown in FIGS. 2 and 3 applies to coils U11 to U41, V12 to V42, and W11 to W41 attached on teeth 42 of motor 1 shown in FIG. 1C.

Coil 5 includes: wound conductive wire 5a; insulating film 5b provided on a surface of wound conductive wire 5a; and lead-out parts 5c, 5d respectively provided on the first turn and the fifth turn of coil 5. A second turn to the fifth turn of coil 5 are each wound in a rectangular shape in a planar view and are each constituted by four coil sides.

Conductive wire 5a is a wire material made of a conductive member having a quadrangular cross-section. Conductive wire 5a is wound in a spiral shape in five turns of a single layers, and constitutes a series of turns stacked in a vertical direction. Conductive wire 5a is formed of, for example, copper, aluminum, zinc, magnesium, brass, iron, steel use stainless (SUS), or the like.

Note that in the following description, a part wound from the tip end of lead-out part 5c to a position below a position at which lead-out part 5d is provided is defined as the first turn. In the subsequent turns, each part wound by one turn is defined, in order, as the second turn to the fifth turn. A starting point of each turn can be arbitrarily defined. The side on which the first turn of coil 5 is provided is referred to as "lower side", and the side on which the fifth turn is provided is referred to as "upper side".

Insulating film 5b is provided on an entire surface of conductive wire 5a so as to insulate between coil 5 and external members (not shown). For example, in motor 1 shown in FIGS. 1A to 1C, insulating films 5b and insulating members (not shown) such as insulating paper are used to insulate between coils 5 and stator core 41 and between coils 5 and teeth 42. The neighboring turns of coil 5 are insulated from each other by insulating film 5b. Insulating film 5b is formed of, for example, enamel, heat resistant resin, or the like. A thickness of insulating film 5b is about several ten μm, for example, 20 μm to 50 μm.

Each of lead-out parts 5c, 5d is a part of conductive wire 5a. To receive supply of current from outside or to supply current to outside, lead-out parts 5c, 5d each extend from a side surface of coil 5, in other words, a plane intersecting the series of turns of conductive wire 5a. To connect to an external member, for example, any one of bus bars 51 to 54 shown in FIGS. 1A to 1C, a part of insulating film 5b of each of lead-out parts 5c, 5d is removed. Insulating film 5b does not have to be removed in an entire area of each of lead-out parts 5c, 5d, and it is enough for insulating film 5b to be removed only on parts necessary for connection to bus bars 51 to 54, for example.

Here, a description will be given, with reference to drawings, on the difference between the shape of coil 50 for comparison and the shape of coil 5 according to the present exemplary embodiment.

First, as shown in FIGS. 4 and 5, in coil 50 for comparison, there is formed a step on an upper surface of the fifth turn, and the step corresponds to a sum of a thickness of conductive wire 50a and twice the thickness of insulating film 50b. Similarly, on a lower surface of the first turn, there is formed a step corresponding to a sum of the thickness of the conductive wire 50a and twice the thickness of insulating film 50b. Coil 50 has lead-out part 50c on the first turn and lead-out part 50d on the fifth turn. Therefore, in coil 50, on each of lead-out parts 50c, 50d, there is formed a step corresponding to each of the thicknesses of the first turn and the fifth turn. As a result, as shown in FIG. 5, there are created dead spaces S where conductive wire 5a is not disposed. If there are dead spaces S, there are created air layers, and the air layers cause reduction of a heat dissipation efficiency of coil 5. Further, for example, when coils 50 are wound on teeth 42 shown in FIG. 1C, a space factor of coil 50 in stator 4 decreases.

On the other hand, as shown in FIGS. 2 and 3, in coil 5 of the present exemplary embodiment, on a part of the coil sides of the second turn, there is formed a deformed part having a shape different from that of the other coil sides of the second turn so that there cannot be created dead space S as shown in FIG. 5 when viewed from the side surface of coil 5. Specifically, the coil side, of the second turn, intersecting lead-out part 5c has a cross-sectional area larger than the cross-sectional areas of the other coil sides. Further, on the coil side intersecting lead-out part 5c, there is formed first notch 5e (deformed part). First notch 5e is formed so as to house a part of the first turn. In the first turn positioned at a lower end part of the series of turns, owing to first notch 5e, a lower surface of the first turn, which is one outer surface positioned on the opposite side with respect to the center of the series of turns of conductive wire 5a of coil 5, extends in a flush manner along with one plane intersecting the series of turns. Here, the one plane intersecting the series of turns is a surface constituted by the lower surface of the first turn and a lower surface of the coil side, of the second turn, provided with first notch 5e; in other words, the one plane intersecting the series of turns is a lower surface of coil 5. That is, the lower surface of coil 5 is configured to be a surface without a step.

Similarly, on a part of the coil sides of the fifth turn, there is formed a deformed part having a shape different from that of the other coil sides of the fifth turn so that there cannot be created dead space S as shown in FIG. 5 when viewed from the side surface of coil 5. Specifically, the coil side, of the fifth turn, intersecting lead-out part 5d has a cross-sectional area larger than the cross-sectional area of the other coil sides. Further, on the coil side intersecting lead-out part 5d, there is formed second notch 5f (deformed part). Second notch 5f is formed so as to house a part of the fifth turn. In the fifth turn positioned at an upper end part of the series of turns, owing to the second notch 5f, the upper surface of the fifth turn, which is one outer surface positioned on the opposite side with respect to the center of the series of turns of conductive wire 5a of coil 5, extends in a flush manner along with another plane intersecting the series of turns. Here, the another plane intersecting the series of turns is the upper surface of the fifth turn and is an upper surface of coil 5. That is, the upper surface of coil 5 is configured to be a surface without a step.

Here, the expression "a surface without a step" or "to extend in a flush manner along a plane intersecting the series of turns" does not mean a surface without any step at all or does not mean a state in which there is no step at all between a surface and a plane intersecting the series of turns. For example, if there is a gap, within an assembly tolerance or a machining tolerance, between a bottom surface of first notch 5e and an upper surface of the part of the first turn housed in first notch 5e, the lower surface of coil 5 may have a step caused by the gap. Further, if a thickness of the first turn and a step of first notch 5e are different within a range of machining tolerance, the lower surface of coil 5 may have a step caused by this difference. Similarly, if there is a gap, within an assembly tolerance or a machining tolerance, between a bottom surface of second notch 5f and a lower surface of the part of the fifth turn housed in second notch 5f, the upper surface of coil 5 may have a step caused by the gap. Further, if a thickness of the fifth turn and a step of second notch 5f are different within a range of machining tolerance, the upper surface of coil 5 may have a step caused by this difference.

When coil 5 is made to have a shape shown in FIGS. 2 and 3, it is possible to eliminate the steps as shown in FIGS. 4 and 5 and to reduce dead spaces S on coil 5 where conductive wire 5a is not wound. This configuration makes it possible to improve the heat dissipation efficiency of coil 5. Further, it is possible to improve the space factor of coils 5 in slots 43 of motor 1 shown in FIGS. 1A to 1C. This can improve an efficiency of motor 1. In particular, the closer to 1 a ratio (T/W) of a thickness T to a width W of conductive wire 5a is, or the smaller number of turns of coil 5 is, the more advantageous in terms of the heat dissipation efficiency and the space factor the use of coil 5 according to the present exemplary embodiment is.

In the present exemplary embodiment, the number of turns of coil 5 is set to 5. However, the number of turns of coil 5 is not particularly limited to the above figure, and the number of turns of coil 5 may be another value.

As described above, coil 5 of the present exemplary embodiment has: a series of turns constituted by a first turn to an n-th turn of a conductive wire having a quadrangular cross-section, where n is an integer equal to or greater than 3, and the conductive wire is wound in a spiral shape and is stacked in a vertical direction; and deformed part 5e or 5f provided on at least a part of conductive wire 5a of the first turn to the n-th turn, where deformed part has a shape different from shapes of the other parts. Further, the first turn and the n-th turn are on the both end parts of the series of turns. In addition, due to deformed part 5e or 5f, an outer surface positioned on an opposite side with respect to a center of the series of turns extends in a flush manner along a plane intersecting the series of turns at each of the first turn and the n-th turn positioned on the both end parts of the series of turns.

This configuration can reduce dead spaces S that are created when coil 5 is wound in a spiral shape and in which no conductive wire is wound. Therefore, the heat dissipation efficiency of the coil can be increased.

Further, the deformed part may be provided on parts of the first turn and the n-th turn of conductive wire 5a or may be provided on parts of the second turn and the n-th turn of conductive wire 5a.

According to this configuration, on the conductive wire of at least a part of the first turn to the n-th turn, there is provided a deformed part having a shape different from that of the other part. Due to the deformed parts, an outer surface positioned on an opposite side with respect to the center of the series of turns can be made to extend in a flush manner along a plane intersecting the series of turns at the first turn and the n-th turn or at the second turn and the n-th turn positioned on the both end parts of the series of turns.

Further, the deformed part may include: first notch 5e provided in such a manner that conductive wire 5a of the second turn houses a part of the first turn; and second notch 5f provided in such a manner that conductive wire 5a of the n-th turn houses a part of the n-th turn.

This configuration deforms a turn of a part of coil 5. This configuration can reduce dead spaces S where conductive wire 5a is not wound, and can thus increase the heat dissipation efficiency of coil 5.

Motor 1 of the present exemplary embodiment includes stator 4 having: stator core 41; teeth 42 protruding from stator core 41; and coils 5 wound on teeth 42.

This configuration further increases the heat dissipation efficiency of coils 5 and improves the space factor of coils 5 in stator 4. This can increase the efficiency of motor 1.

First Modified Example

Figure 6:
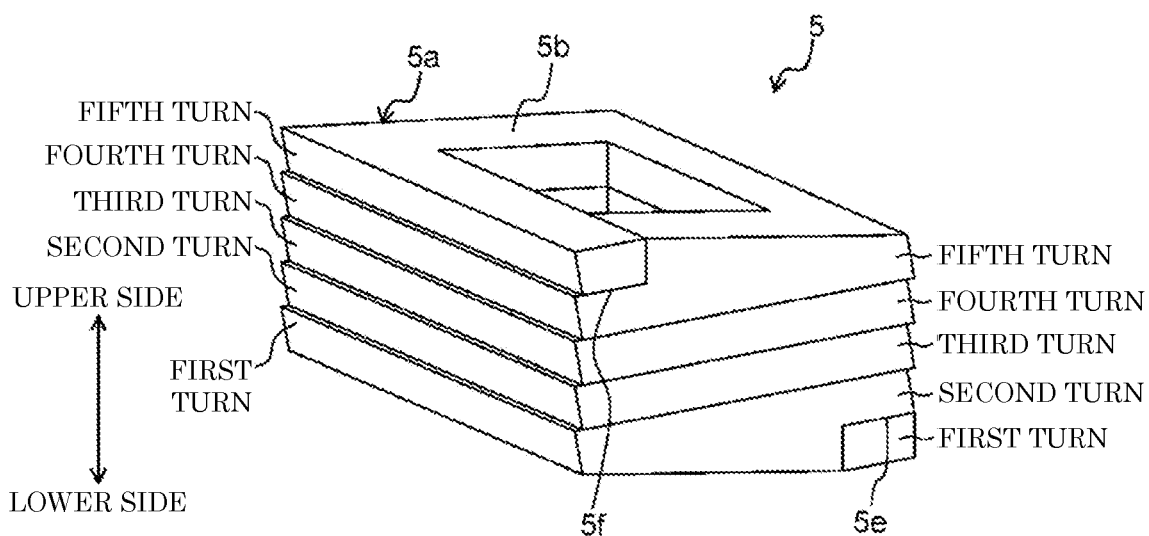
FIG. 6 is a perspective view showing a coil according to a first modified example.

FIG. 6 is a perspective view showing coil 5 according to a first modified example. Note that in FIG. 6, lead-out parts 5c, 5d are not shown for the sake of convenience of description.

The shape of the cross-section of conductive wire 5a is different between coil 5 according to the present modified example and coil 5 shown in FIGS. 2 and 3. In coil 5 shown in FIGS. 2 and 3, the cross-section of conductive wire 5a at each turn has a shape of a skewed rectangle. This shape prevents steps from being formed on the side surfaces of coil 5. On the other hand, in coil 5 shown in FIG. 6, conductive wire 5a at each turn has substantially a rectangular cross-section. Therefore, steps are formed between neighboring turns on the side surfaces of coil 5.

As shown in FIG. 6, also in the present modified example, in the first turn positioned at the lower end part of the series of turns, owing to first notch 5e, the lower surface of the first turn, which is one outer surface positioned on the opposite side with respect to the center of the series of turns of conductive wire 5a of coil 5, extends in a flush manner along with one plane intersecting the series of turns. Here, the one plane intersecting the series of turns is a surface constituted by the lower surface of the first turn and a lower surface of the coil side, of the second turn, provided with first notch 5e; in other words, the one plane intersecting the series of turns is a lower surface of coil 5. That is, the lower surface of coil 5 is configured to be a surface without a step.

Similarly, in the fifth turn positioned at the upper end part of the series of turns, owing to the second notch 5f, the upper surface of the fifth turn, which is one outer surface positioned on the opposite side with respect to the center of the series of turns of conductive wire 5a of coil 5, extends in a flush manner along with another plane intersecting the series of turns. Here, the another plane intersecting the series of turns is the upper surface of the fifth turn and corresponds to the upper surface of coil 5. That is, the upper surface of coil 5 is configured to be a surface without a step.

Also in the present modified example, it is possible to reduce the dead spaces and to thus increase the heat dissipation efficiency of coil 5. Further, it is possible to improve the space factor of coils 5 in slots 43 of motor 1 shown in FIGS. 1A to 1C. This can improve an efficiency of motor 1.

Note that in the present modified example, since there are steps formed on the side surfaces of coil 5, the above space factor is slightly smaller than that of coil 5 having the configuration shown in FIGS. 2 and 3. However, a wire material having a rectangular cross-section, which is typically used, can be used as conductive wire 5a except parts of the second turn and the fifth turn, and it is therefore advantageous in terms of manufacturing cost.

Second Modified Example

Figure 7:
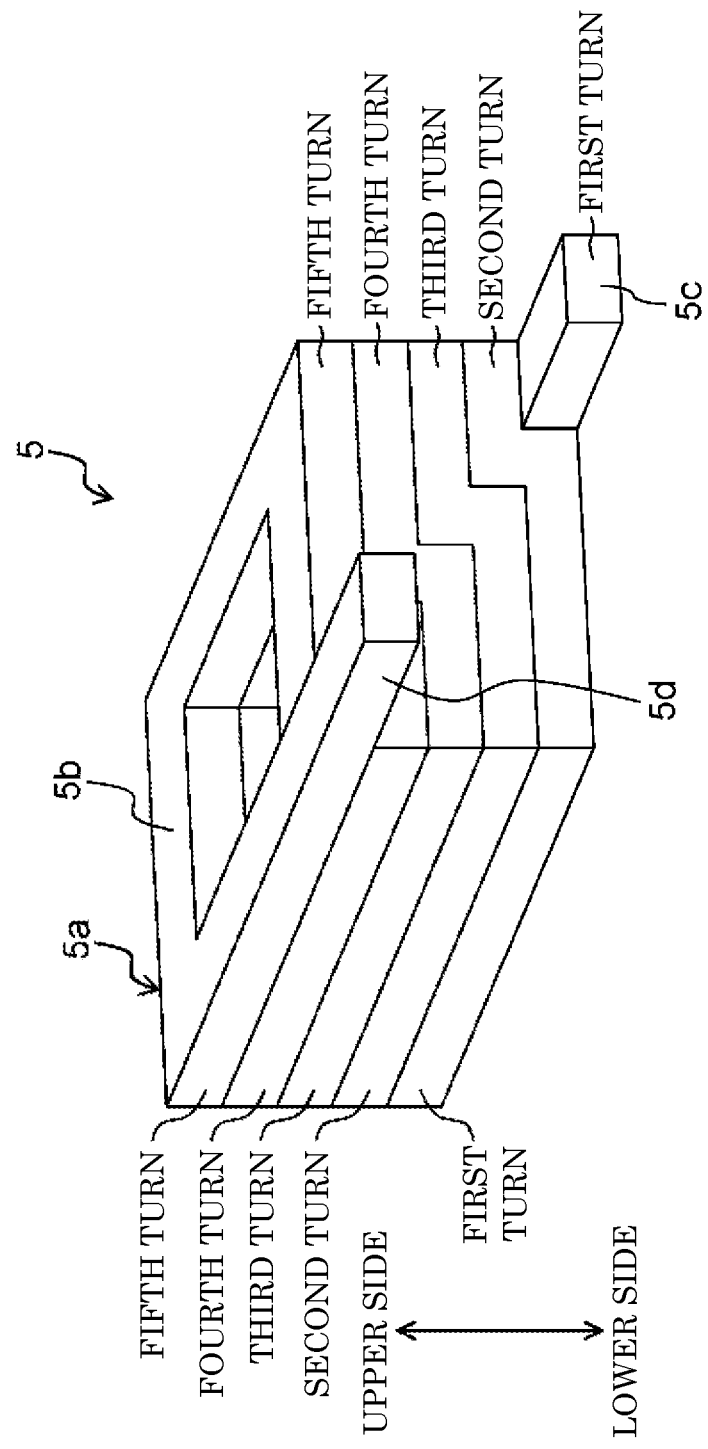
FIG. 7 is a perspective view showing a coil according to a second modified example.
Figure 8:
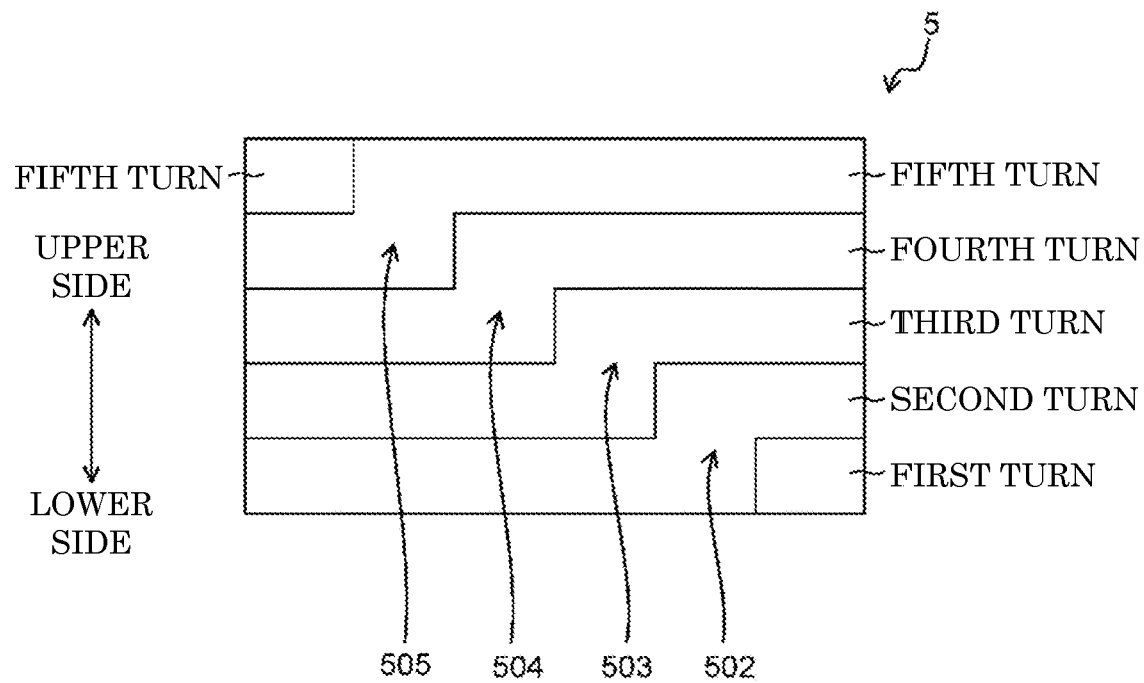
FIG. 8 is a side view showing the coil according to the second modified example.

FIG. 7 is a perspective view showing coil 5 according to a second modified example. FIG. 8 is a side view showing coil 5 according to the second modified example. FIG. 8 shows a side surface of coil 5 when viewed from a direction of tip ends of lead-out parts 5c, 5d each provided on each of the first turn and the fifth turn of coil 5.

Coil 5 according to the present modified example is different from coil 5 shown in FIGS. 2 and 3, and the shapes of the coil sides, at the second turn to the fifth turn, intersecting lead-out part 5c, 5d are different from the shapes of the other coil sides of the second turn to the fifth turn.

As shown in FIGS. 7 and 8, at the second turn to the fifth turn, each of the coil sides intersecting lead-out parts 5c, 5d is provided with a bent part, which is a deformed part. The bent parts are formed, at the second turn to the fifth turn, by bending conductive wire 5a of the coil sides intersecting lead-out parts 5c, 5d into a step shape. Specifically, the second turn, the third turn, the fourth turn, and the fifth turn are respectively provided with bent part 502, bent part 503, bent part 504, and bent part 505.

Between the first turn and the second turn, (i) the coil side, of the first turn, including lead-out part 5c and (ii) bent part 502 are engaged with each other in a contact manner. Between the second turn and the third turn, bent part 502 and bent part 503 are engaged with each other in a contact manner. Between the third turn and the fourth turn, bent part 503 and bent part 504 are engaged with each other in a contact manner. Between the fourth turn and the fifth turn, bent part 504 and bent part 505 are engaged with each other in a contact manner. At the fifth turn, (i) the coil side, of the fifth turn, including lead-out part 5d and (ii) bent part 505 are engaged with each other in a contact manner.

Further, as shown in FIGS. 7 and 8, also in the present modified example, in the first turn positioned at the lower end part of the series of turns, the lower surface of the first turn, which is one outer surface positioned on the opposite side with respect to the center of the series of turns of conductive wire 5a of coil 5, extends in a flush manner along with one plane intersecting the series of turns. Here, the one plane intersecting the series of turns is a surface constituted by the lower surface of the first turn and the lower surface of the coil side, of the second turn, provided with bent part 502; in other words, the one plane intersecting the series of turns is a lower surface of coil 5. That is, the lower surface of coil 5 is configured to be a surface without a step.

Similarly, in the fifth turn positioned at the upper end part of the series of turns, the upper surface of the fifth turn, which is one outer surface positioned on the opposite side with respect to the center of the series of turns of conductive wire 5a of coil 5, extends in a flush manner along with another plane intersecting the series of turns. Here, the another plane intersecting the series of turns is the upper surface of the fifth turn and corresponds to the upper surface of coil 5. That is, the upper surface of coil 5 is configured to be a surface without a step.

Also in the present modified example, it is possible to reduce the dead spaces and to thus increase the heat dissipation efficiency of coil 5. Further, it is possible to improve the space factor of coils 5 in slots 43 of motor 1 shown in FIGS. 1A to 1C. This can improve an efficiency of motor 1. Further, in coil 5, since bent parts 502 to 505 are provided on the second turn to the fifth turn, the side surface shape of coil 5 wound in a spiral shape can be made substantially rectangular. When coils 5 are wound on teeth 42, the above configuration makes it possible for the coils to be disposed without gaps; and the space factor can be therefore improved.

In the present modified example, the number of turns of coil 5 is five, but the number of turns is not particularly limited to this figure, and the number of turns of coil 5 may be another value.

As described above, the deformed part of the present modified example include: a first bent part that is a part of conductive wire 5a of the (i−1)th turn and is bent into a step shape, where i is an integer satisfying 3≤i≤n−1; and a second bent part that is a part of conductive wire 5a of the i-th turn and is bent into a step shape, where the first bent part and the second bent part only have to be engaged with each other in a contact manner.

Third Modified Example

Figure 9:
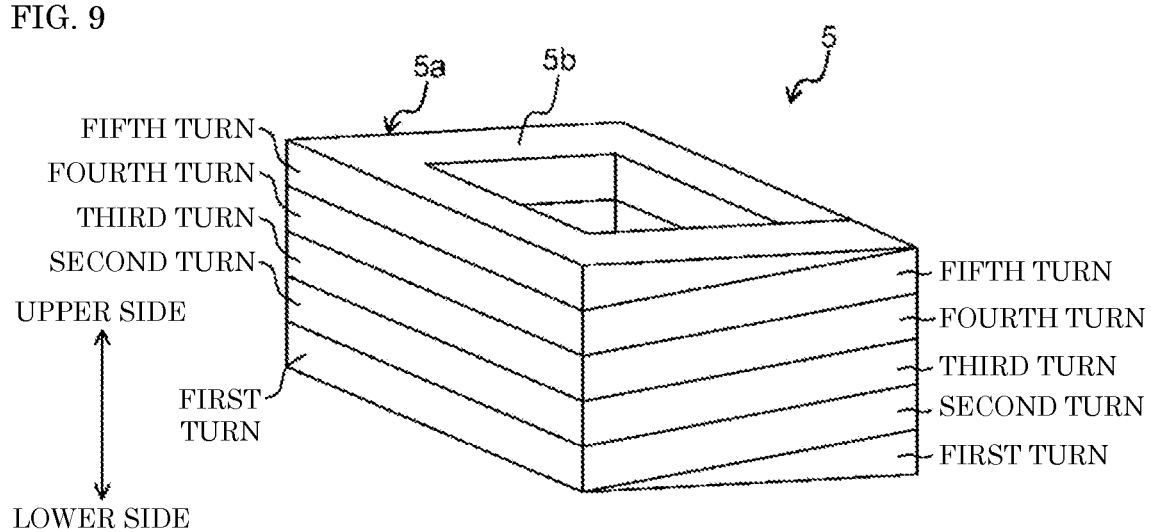
FIG. 9 is a perspective view showing a coil according to a third modified example.

FIG. 9 is a perspective view showing coil 5 according to a third modified example. Note that in FIG. 9, lead-out parts 5c, 5d are not shown for the sake of convenience of description.

Coil 5 according to the present modified example is different from coil 5 shown in FIGS. 2 and 3, and the shape of a part of the coil sides of the first turn of coil 5 is different from the shapes of the other coil sides of the first turn. Similarly, the shape of a part of the coil sides of the fifth turn is different from the shapes of the other coil sides of the fifth turn. That is, a part of the coil sides of the first turn is provided with a deformed part having a shape different from the shapes of the other coil sides of the first turn. A part of the coil sides of the fifth turn is provided with a deformed part having a shape different from the shapes of the other coil sides of the fifth turn.

In coil 5 shown in FIGS. 2 and 3, the lower surface of coil 5 is constituted by the lower surface of the first turn and the lower surface of the coil side, of the second turn, provided with first notch 5e, and the upper surface of coil 5 is constituted by the upper surface of the fifth turn. In contrast, in coil 5 according to the present modified example, a cross-sectional area of the coil side, of the first turn, including a winding start part changes compared with the other coil sides so as to eliminate a dead space, and the lower surface of the first turn constitutes the lower surface of coil 5. Similarly, a cross-sectional area of the coil side, of the fifth turn, including a winding end part changes compared with the other coil sides so as to eliminate a dead space, and the upper surface of the fifth turn constitutes the upper surface of coil 5.

As shown in FIG. 9, also in the present modified example, in the first turn positioned at the lower end part of the series of turns, the lower surface of the first turn, which is one outer surface positioned on the opposite side with respect to the center of the series of turns of conductive wire 5a of coil 5, extends in a flush manner along with one plane intersecting the series of turns. Here, the one plane intersecting the series of turns is the lower surface of the first turn and corresponds to the lower surface of coil 5. That is, the lower surface of coil 5 is configured to be a surface without a step.

Similarly, in the fifth turn positioned at the upper end part of the series of turns, the upper surface of the fifth turn, which is the other outer surface positioned on the opposite side with respect to the center of the series of turns of conductive wire 5a of coil 5, extends in a flush manner along with another plane intersecting the series of turns. Here, the other plane intersecting the series of turns is the upper surface of the fifth turn and corresponds to the upper surface of coil 5. That is, the upper surface of coil 5 is configured to be a surface without a step. Further, as shown in FIG. 9, the deformed part is provided on conductive wire 5a of each of the first turn and the fifth turn.

Also in the present modified example, it is possible to reduce the dead spaces and to thus increase the heat dissipation efficiency of coil 5. Further, it is possible to improve the space factor of coils 5 in slots 43 of motor 1 shown in FIGS. 1A to 1C. This can improve an efficiency of motor 1.

Note that in the modified examples and the exemplary embodiment, the descriptions have been given by using examples in which coil 5 is provided in stator 4 of motor 1. However, the techniques disclosed here are not particularly limited to the above examples. The techniques disclosed here can be applied to other use, for example, for coils in generators, reactors in power instruments, and the like.

In the examples described above, lead-out parts 5c, 5d are led out to the outer peripheral side from the same side surface of coil 5. However, lead-out part 5c and lead-out part 5d may be led out to the outer peripheral side from different side surfaces of coil 5. For example, lead-out parts 5c, 5d may be separately led out from side surfaces of coil 5 opposing each other. Further, the shape of the cross-section of conductive wire 5a only has to be a quadrangular shape and may be a rectangular shape, a trapezoidal shape, or a parallelogram shape.

In the modified examples and the exemplary embodiment, the deformed parts are provided in coil 5 in such a manner that the dead spaces to be created on both of the upper surface and the lower surface of coil 5 are prevented from being created. However, the deformed part may be provided in coil 5 in such a manner that a dead space is not created on one of the upper surface and the lower surface of coil 5. Also in this case, the heat dissipation efficiency of the coil can be increased.

Coil 5 can be formed by casting. By this method, it is easy to form a conductive wire having a large cross-sectional area into a wound coil having a spiral shape. However, methods other than casting can be used for forming. For example, coil 5 may be formed by carving a solid material such as copper, aluminum, zinc, magnesium, iron, SUS, or brass. Alternatively, for example, coil 5 may be formed by connecting independently formed components to each other by welding or other methods.

INDUSTRIAL APPLICABILITY

The coil according to the present disclosure can increase the heat dissipation efficiency of the coil and is usefully applied to motors and power instruments.

REFERENCE MARKS IN THE DRAWINGS

1: motor
2: shaft
2a: hollow part
2b: through hole

3: rotor
4: stator
5: coil
5*a*: conductive wire
5*b*: insulating film
5*c*, 5*d*: lead-out part
5*e*: first notch (deformed part)
5*f*: second notch (deformed part)
31: magnet
41: stator core
42: tooth
43: slot
50: coil
50*a*: conductive wire
50*b*: insulating film
50*c*, 50*d*: lead-out part
51-54: bus bar
502, 504: bent part (first bent part)
503, 505: bent part (second bent part)
C: cooling medium
S: dead space
U11, U22, U32, U41, V12, V21, V31, V42, W11, W22, W32, W41: coil

The invention claimed is:

1. A coil comprising:
a series of turns constituted by a first turn to an n-th turn of a conductive wire having a quadrangular cross-section, where n is an integer equal to or greater than 3, the conductive wire being wound in a spiral shape and being stacked in a vertical direction; and
a deformed part provided on at least a part of the conductive wire of the first turn to the n-th turn, the deformed part having a shape different from shapes of other parts, wherein:
the first turn and the n-th turn are positioned on both end parts of the series of turns,
at each of the first turn and the n-th turn, the deformed part makes an outer surface positioned on an opposite side with respect to a center of the series of turns extend in a flush manner along a plane intersecting the series of turns,
the deformed part is provided on the part of each of the second turn and the n-th turn of the conductive wire,
the deformed part includes:
a first notch provided in the conductive wire of the second turn in such a manner that a part of the first turn is housed in the first notch; and
a second notch provided in the conductive wire of the n-th turn in such a manner that a part of the n-th turn is housed in the second notch,
the second turn to the n-th turn are each wound in a rectangular shape in a planar view and are each constituted by four coil sides, and
in the first turn positioned at a lower end part of the series of turns, owing to the first notch, a lower surface of the first turn extends in a flush manner along with one plane intersecting the series of turns, wherein the lower surface of the first turn is one outer surface positioned on the opposite side with respect to the center of the series of turns, and the one plane intersecting the series of turns is a surface constituted by the lower surface of the first turn and a lower surface of a coil side, of the second turn, provided with the first notch.

2. A motor comprising a stator, the stator including:
a stator core;
a tooth protruding from the stator core; and
the coil according to claim 1 that is wound on the tooth.

* * * * *